United States Patent [19]

Prikkel, III

[11] E Re. 31,112

[45] Reissued Dec. 28, 1982

[54] AUTOMATIC FLUE DAMPER

[76] Inventor: John Prikkel, III, 2952 Ensley Ave., Dayton, Ohio 45414

[21] Appl. No.: 29,927

[22] Filed: Apr. 13, 1979

Related U.S. Patent Documents

Reissue of:

[64] Patent No.: 4,108,369
Issued: Aug. 22, 1978
Appl. No.: 781,649
Filed: Mar. 28, 1977

[51] Int. Cl.[3] ..... F23L 11/00
[52] U.S. Cl. ..... 236/1 G; 126/285 B
[58] Field of Search ..... 236/1 G, 74; 431/20; 110/163; 126/285 B

[56] References Cited

U.S. PATENT DOCUMENTS

| | | | |
|---|---|---|---|
| 2,037,363 | 4/1936 | Branche | 236/74 X |
| 2,226,081 | 12/1940 | Stuart | 236/1 G |
| 3,090,558 | 5/1963 | Vaughn | 236/1 G |
| 3,197,139 | 7/1965 | Diermayer et al. | 236/1 G |
| 3,580,238 | 5/1971 | Diehl | 110/163 |
| 4,021,187 | 5/1977 | Schulte et al. | 126/285 B |
| 4,039,123 | 8/1977 | Frankel | 126/285 B |
| 4,046,318 | 9/1977 | Ripley | 236/1 G |
| 4,079,884 | 3/1978 | Sherman | 236/1 G |
| 4,102,629 | 7/1978 | Feinberg | 126/285 B |

*Primary Examiner*—William E. Wayner
*Attorney, Agent, or Firm*—Dybvig & Dybvig

[57] ABSTRACT

In the present invention, an automatic flue damper located in the vent stack of a household furnace or other apparatus requiring venting is interfaced with a thermostatic control and a fuel supply valve associated with the apparatus so as to maintain a vent passage to the atmosphere normally open during times when combustion is occurring in the apparatus and to close the vent passage at an appropriate time following the termination of combustion in the apparatus. The normally open vent condition is maintained by a damper positioning spring. Vent closure following combustion is accomplished by means of a direct current solenoid. Further included in the interfacing circuitry are a temperature sensing device effective to disable the solenoid, thus opening the vent, upon the appearance of unsafe stack temperatures and a pressure sensor which also disables the solenoid to open the vent stack upon the occurrence of an inappropriate discharge of fuel to the combustion chamber. The pressure sensor then also sounds an alarm to alert those nearby of the unauthorized escape of fuel.

20 Claims, 7 Drawing Figures

AUTOMATIC FLUE DAMPER

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to automatic flue dampers for use in household and industrial applications and more particularly to a flue damper for association with a combustion apparatus, which damper is biased open during combustion periods and is equipped with electrical circuitry for substantially closing the damper following combustion periods so as to confine the heated atmosphere resulting from combustion.

2. Prior Art

Various flue dampers are known in the prior art. An example appears in U.S. Pat. No. 3,580,238, which discloses an automatic damper arrangement normally spring-biased to a closed position and solenoid-operated to an open position. For many applications, such a damper arrangement presents hazards which may result, for example, from a defective gas valve which permits gas to escape into the combustion chamber at a time when the furnace vent stack remains normally closed, thus flooding the household or other building with dangerous fumes.

U.S. Pat. No. 3,934,796 is of more recent vintage but continues the disadvantage of the preceding patent by employing a damper which is normally biased closed. U.S. Pat. No. 2,937,697 illustrates a prior art damper mechanism which closes combustion chamber outlets after combustion is shut off.

It should be noted that the practice in many parts of the United States has been to construct furnaces and the like without dampers, thus eliminating any need for a damper control mechanism at the expense of substantial losses of heated air through the open vent stack following periods of combustion.

An object of the present invention is to provide an improved automatic damper of the type normally closing a vent stack during times when combustion does not occur and equipped with safety features appropriate for a vent stack which is normally maintained closed.

SUMMARY OF THE INVENTION

In the present invention, the loss of desirably retained heated gases through an open vent stack has been minimized following combustion while providing a normally open vent stack during combustion periods. To accomplish this desirable mode of operation, electrically powered motive means, such as a solenoid, is used to normally close a damper located in the vent stack during periods when combustion is not occurring. Control circuitry associated with the present invention disables such motive means immediately prior to the occurrence of combustion and returns power to the motive means only after an appropriate time has elapsed following the completion of a combustion period which brings the atmosphere being heated to the desired temperature. Since the stack is closed at generally all times except during and a short time following combustion, possible hazards resulting from an unwarranted leakage of fuel in the atmosphere sought to be controlled or from an unwarranted continuance of combustion after a thermostat has endeavored to terminate combustion are controlled in the present invention by means of specialized safety features more fully discussed in the detailed description which follows.

DESCRIPTION OF THE PREFERRED EMBODIMENT

Figure 1:
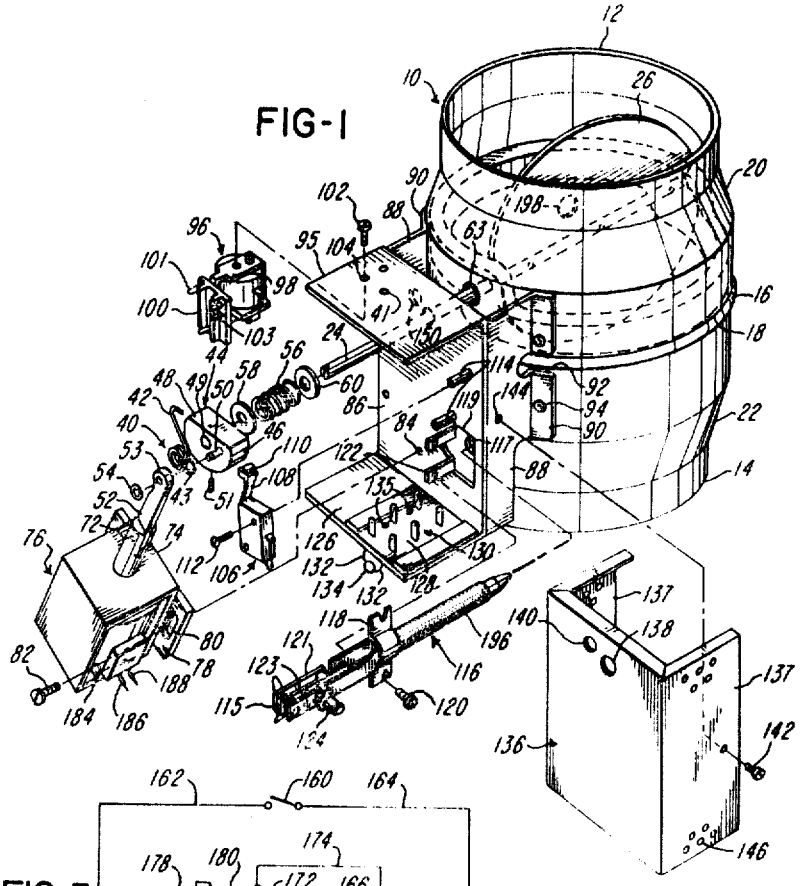
FIG. 1 is an exploded perspective view illustrating a damper mechanism in accordance with the present invention.

Referring to FIG. 1, the preferred embodiment comprises a damper housing 10 which is adapted to be interposed or otherwise placed in the vent stack (not shown) which emerges upwardly from the combustion chamber of a heating or cooling appliance. The appliance (not shown), may for example, be a gas-fired household furnace of the type having a vent stack projecting upwardly through the roof of the house. Those skilled in the art will understand, however, that the present invention is also applicable to oil-fired appliances and may be applied to numerous industrial as well as home applications.

Figure 3:
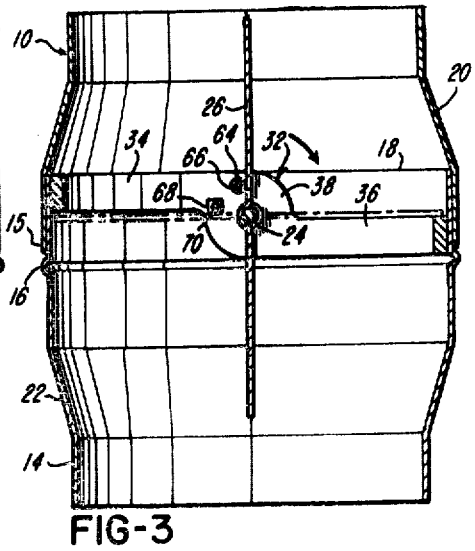
FIG. 3 is a vertical section view of the damper mechanism.

The damper housing 10 is constructed in two separable parts, an upper part 12 and a lower part 14. The lower part 14 terminates with an upper edge 18 telescopically received in the lower edge 15 of the upper part 12. As shown in FIG. 3, the lower part 14 has an expanded bead 16 which abuts the lower edge 15 of the upper part 12.

The upper part 12 has a conical enlargement 20, and the lower part 14 likewise has a conical enlargement 22, the enlargements 20 and 22 providing the housing 10 with an intermediately located diameter which allows a damper 26 to be mounted within the housing 10 for rotation by means of a transverse shaft 24. The enlargements 20 and 22 allow damper installation without diminishment in the size of the passage through which gases to be vented upwardly through the housing 10 will pass.

The damper 26 is preferably a one-piece metal sheet have a circular outer periphery and having a centrally disposed, diametric groove 28 shaped to cradle the shaft 24. Rivets 30 best appearing in FIG. 4 affix the damper 26 to the shaft 24 so that the damper and the shaft will move in unison.

Disposed within the upper part 12 is an annular ring 32 having an upper half 34 and a lower half 36 joined by diametrically disposed hubs 38. The upper and lower halves 34 and 36 are axially offset so that the damper plate 26, when rotated from the vertical position illustrated in FIG. 3 in the clockwise direction appearing in FIG. 3, can be advanced to a generally horizontal position closely approaching but not abutting the upper and lower halves 34 and 36 of the ring 32.

The shaft 24 is normally biased by a torsion spring 40 to place the damper 26 in the vertical position illustrated in FIG. 3. As appears in FIG. 1, the torsion springs 40 surrounds an end portion of the shaft 24 which projects outwardly from the housing 10. The torsion spring 40 has an outwardly extending arm 42 which is hooked into an aperture 41 located in the upper wall of a cover means later to be described. The spring 40 also has an integrally formed hook portion 43, whose function will be described shortly.

Affixed nonrotatably to the shaft 24 adjacent the spring 40 is a cam 44 having a circular periphery 46 interrupted as to circularity by a chordally extending flat 48. The cam 44 has an aperture 49 sized to receive the shaft 24 and has a key member 51 radially entering through its circular periphery 46 to nonrotatably key the cam 44 to the shaft 24.

Projecting outwardly from one side face of the cam 44, as shown in FIG. 1, is a pin 50 press-fitted into the body of the cam 44. The pin 50 passes through the spring hook 43 and then passes through an aperture 53 located in a link 52. The pin 50 is engaged at its outer end by a clamp ring 54.

For reasons to be described, a drag is placed upon the rotation of the shaft 24 by means of a compression spring 56 which encircles the shaft 24 and acts between washers 58 and 60, the washer 58 bearing against the side of the cam 44 which is opposite the pin 50, and the washer 60 bearing against the outside wall of the housing part 12.

In the assembled device, the clearance between the housing part 12 and the cam 44 is small in relation to length of the compression spring 56 and this condition establishes a frictional drag upon rotation of the shaft 24 by pressing the washers 58 and 60 respectively against the cam 44 and the housing part 12.

The shaft 24 is otherwise supported for free rotation by means of bushings 62 disposed centrally in the hubs 38 located on diametrically opposite sides of the ring 32. As appears in FIG. 1, the upper part 12 of the housing 10 has an aperture 63 through which the shaft 24 passes outwardly of the housing 10.

Rotation of the shaft 24 and its affixed damper plate 26 is restricted as follows. Referring to the open or vertically disposed position illustrated in FIG. 3, the damper plate 26 is biased to rotate in the counterclockwise direction by means of the torsion spring 40 but is stopped upon reaching the illustrated vertical position by means of a resilient tube 64 surrounding a pin 66 pressed into a suitable aperture located in the ring 32.

Figure 4:
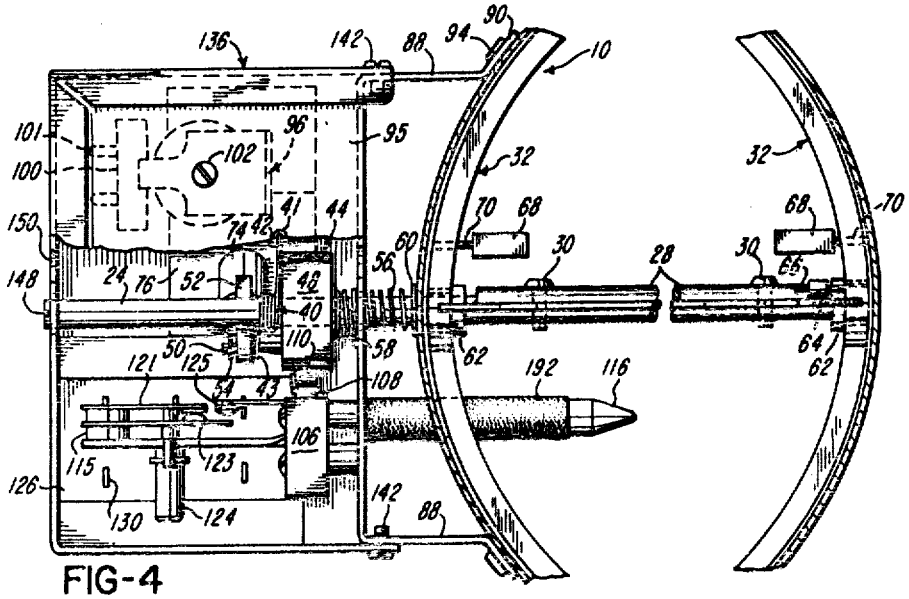
FIG. 4 is a top plan view of the damper mechanism with portions broken away to simplify the illustration.

Solenoid mechanism to be described is energizable to cause a rotation of the damper plate 26 in the clockwise direction as it appears in FIG. 3, whereupon the damper plate is caused to seat against a pair of bumpers 68, each surrounding a pin 70, there being two such pins located to opposite sides of the ring 32 as appears in FIG. 4. Two bumpers 68 are preferred in this construction for absorbing the greater momentum of the damper plate 26 imparted by the solenoid. The compression spring 56 cooperates with the washers 58 and 60 to reduce bouncing of the damper plate against the bumpers 68. A single resilient tube 64, acting in cooperation with the drag mechanism, is found sufficient to absorb the relatively smaller momentum imparted to the damper plate 26 when returned by the spring 40 to the vertical position illustrated in FIG. 3.

The solenoid, which is employed to move the damper from the vertical position illustrated in FIG. 3 to its horizontal position resting upon the bumpers 68, is identified by the reference number 76 in FIG. 1. This solenoid has an axially movable armature 74 pivotally connected to the aforementioned link 52 by means of a pin 72 passing diametrically across a bifurcated end portion of the armature 74. Because the link 52 is pivotally joined to the pin 50 located on the cam 44, energization of the solenoid 76 will draw the armature 74 downwardly as appears in FIG. 1, thus rotating the shaft 24 in the clockwise direction as it appears in FIG. 1. The spring 40 yieldably resists such motion and acts upon solenoid deenergization to return the cam 44 as well as the shaft 24 to approximately their original positions illustrated in FIG. 1.

The solenoid 76 is provided with oppositely projecting wing portions 78, each having a slot 80 for the receipt of a threaded fastener 82 which enters an aperture 84 located in a cover plate 86 to mount the solenoid 76 to the cover plate 86.

Cover plate 86 can be seen in FIG. 1 to have side portions 88 bent downwardly from the cover plate 86 for supporting the cover plate away from the housing 10. The side portions 88 each have outwardly projecting wings 90 matching the wall contours of the upper and lower housing parts and separated by a notch 92 sized to receive the housing bead 16. The wings 90 are attached to the upper and lower housing parts by an appropriate number of rivets 94.

The cover plate 86 can also be seen to have outwardly bent walls 95 and 126 which cooperate to receive therebetween the aforementioned solenoid 76.

The wall 95 is provided with an aperture 104 adapted to receive a threaded screw 102 which threadedly engages the ferromagnetic frame 98 of an electromagnetic relay 96 having appropriate terminals, later to be described, mounted on a terminal support 100. The wall 95 also has located thereon the aforementioned aperture 41 for receiving the spring arm 42.

Mounted to the cover plate 86 by a fastener 112 is a switch 106 having an outwardly projecting operator arm 108 terminating with a cam follower 110, the follower 110 biased to follow the periphery of the aforementioned cam 44. The switch 106 is spaced an appropriate distance from the cover plate 86 by means of a spacer sleeve 114 bearing against the cover plate 86 and surrounding fastener 112.

Also mounted to the cover plate 86 is a commercially available heat sensor 116 equipped with wings 118 secured by threaded fasteners such as shown at 120 to suitable support posts 122 struck from the cover plate 86.

The sensor 116 passes into the interior of the housing 10 through an aperture 117 formed in the lower part 14 of that housing. The cover plate 86 is also provided with a window 119 aligned with the aperture 117 to accommodate the sensor 116.

As best seen in FIG. 4, the sensor 116 includes switch elements 121 and 123 mounted to insulating means 115. The switch element 123 has an aperture (not shown) through which passes an adjuster 124, the adjuster 124 being adjustable to regulate the position of the switch element 121, such adjustment being followed by the switch element 123. The sensor 116 further includes an operator 125 having a position which changes with temperature. When the operator 125 bears against the switch element 123 with a pressure sufficient to separate the switch elements 121 and 123, the sensor 116, which comprises a normally closed switch, becomes an open switch.

The aforementioned wall 126 has mounted on that face thereof which confronts the wall 95 a dielectric plate 128 supporting a plurality of electrically conductive terminal members designated generally by the reference number 130. As best appears in FIG. 1, the terminal members 130 are six in number and for convenience have been numbered 1, 2, 3, 4, 5 and 6 with appropriate legends applied in FIG. 5.

A lamp 134 disposed under the wall 126 has lead wires 132 passing through suitable apertures 135 for soldered engagement to the terminal members 3 and 5.

The confronting wall members 95 and 126 cooperate to receive thereon a cover shield 136 having one relatively large aperture 138 and another relatively small aperture 140 in one face thereof. The aperture 138 is so located as to receive the previously described shaft 24. The shaft 24 has a notch 148 in the end face thereof which is exposed by the aperture 138. The applications for this notch 148 along with the aperture 140 will be described in succeeding remarks.

Referring further to the cover shield 136, the shield is formed in a general U shape by bending downwardly therefrom side walls 137 which cooperate with the end walls 95 and 126 of the cover plate 128 to form a rectangular box receiving several of the electrical components heretofore described. Cover shield 136 is fixed into position by means of one or more threaded fasteners, such as shown at 142 in FIG. 1. The side walls 137 are also provided with several ventilation apertures 146 for the purpose of minimizing the buildup of heat about the electrical components assembled into the volume enclosed by the cover plate 86, its side walls 95 and 126 and the cover shield 136.

Figure 6:
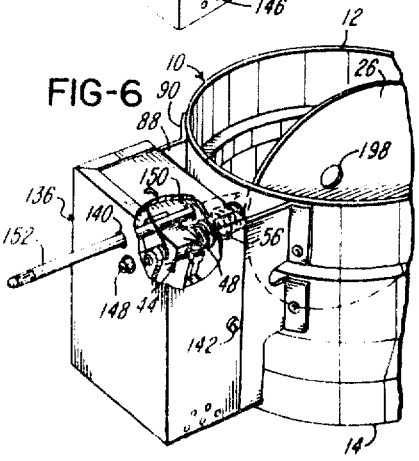
FIG. 6 is a fragmentary perspective view with a portion broken away to illustrate the manner in which a protective measure can be taken with the damper mechanism of the present invention.
Figure 2:
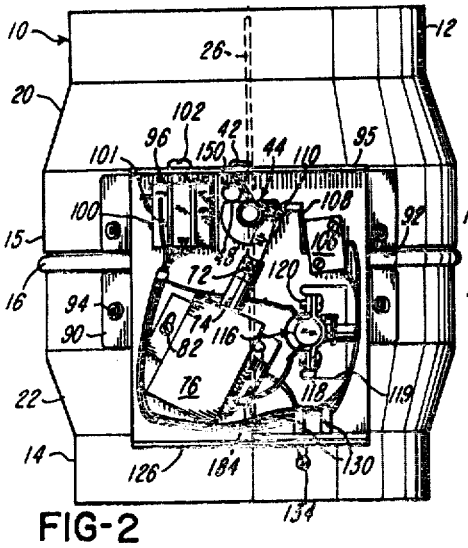
FIG. 2 is an elevation view of the damper mechanism with a portion broken away to schematically illustrate the wiring and other features of the invention.

The cover plate 86 has an aperture 150 therein coaxially aligned with the aforementioned aperture 140 located in the cover shield 136. The alignment of the apertures 140 and 150 and their diametric size are such that a tool, such as a conventional wood pencil 152, may be passed coaxially through both apertures 140 and 150, as is shown in FIG. 6.

Assuming the solenoid 76 not to be energized, the peripheral flat 48 of the cam 44 will be in a generally horizontal position below the inserted pencil 152 when the housing 10 has been assembled in a desired vertical position. The consequence is that the pencil 152 may be used to lock the damper plate 26 in a position opening the housing 10. This feature is desirable in the event of failure of the spring 40 to give assurance that the vent housing will remain open.

In the preceding portions of this specification, a device adapted to be inserted in the vent stack or flue of a heating or cooling apparatus utilizing fuel combustion has been described. The electrical components included in the device comprise a motive means or solenoid 76, a relay 96, a cam-operated switch 106, a heat sensor 116 and a lamp 134. Associated with the solenoid 76 and not heretofore described is a rectifier 184 having terminals 186 and 188, which is built into the solenoid package as shown in FIG. 1.

Figure 5:
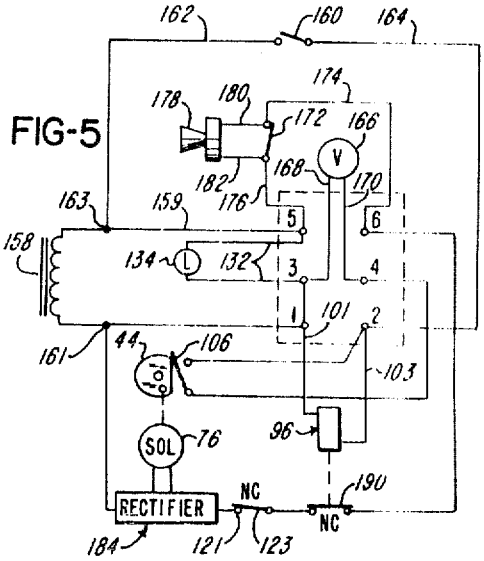
FIG. 5 is a schematic illustration of electrical circuitry appropriate to interface the damper mechanism with conventional thermostatic control circuitry.

For the purpose of describing an application for the disclosed invention, one can assume an existing house (not shown) which is already equipped with a gas furnace, a thermostat, a gas valve and a transformer stepping down the normal 115 volts available in the household to a lower level, such as 24 volts AC. It can further be assumed that the thermostat is a thermally responsive switch 160 and is connected in series with the transformer secondary 158 and possibly other components. The installer cuts the thermostat connections and by suitable extension wires 162 and 164 connects the cut thermostat connections respectively to the terminals 1 and 2 of the present device, as is illustrated in FIG. 5. The installer next locates the gas valve, which has two wires leading thereto, cuts such wires and by suitable extensions 168 and 170 connects the cut wires emanating from the gas valve to the terminals 3 and 4, as illustrated in FIG. 5.

The relay coil 96 can be seen in FIG. 5 to have been connected in series with the thermostat switch 160 and the transformer secondary 158 by reason of terminal connections 101 and 103 extending from the relay coil to the terminals 1 and 2. Depending upon the particular type of relay being employed, the relay may tend to chatter or even fail to operate upon closure of the switch 160 if the gas valve or the transformer secondary have been connected with the wrong polarity.

To test the operativeness of the connections, the previously described lamp 134 has been assembled with the previously described connections to terminals 3 and 5 for use as a single device. Furthermore, the terminal 5 is provided with a wire 159 extending therefrom with its distal end initially unattached. The installer touches this loose end successively to the opposite ends 161 and 163 of the secondary, noting which end of the secondary provides a steady glow of the lamp 134, and permanently attaches the heretofore loose end of the wire 159 to the end of the secondary which provides the steadiest lamp glow. This provides a power connection to the relay 96 which is of the proper polarity.

It will be noted that the terminals 1 and 3 could have been constructed as a single terminal. However, the two terminals are preferably provided so as to simplify the installation procedure and to provide for the attachment of other circuit elements not necessary to the present invention. Likewise, the terminal 6 might have been omitted but simplifies the wiring of the components.

The illustration of FIG. 5 assumes the proper connection was made to the end 163 of the secondary 158. Since the installer will not ordinarily know the transformer polarity without a test such as described, however, the permanent connection for the wire 159 is ordinarily not established until a test such as described.

Figure 7:
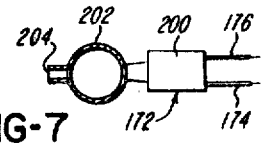
FIG. 7 is a schematic illustration showing a gas manifold having an associated pressure responsive switch mechanism.

The installer next connects a pressure switch 172 having lead connections 174 and 176 across the circuit board terminals 5 and 6. As is shown in FIG. 7, the pressure switch 172 is contained in a housing 200 installed in communication with the gas manifold 202 so as to respond to the pressure of gas which flows in the manifold to enter the combustion chamber through a gas orifice 204. The function of the pressure switch will be later described.

The installer also places an audible alarm device 178, which is of conventional, commercially available construction, across the leads 174 and 176 for the pressure switch 172 by means of lead connections 180 and 182 extending to the alarm device.

With the foregoing installations, the structure of the present application is in readiness for operation. One can assume that the thermostat switch 160 is initially open and, therefore, the thermostat switch is not demanding heat. At such time, the solenoid 76 is energized to close the damper 26 over a safety circuit path which extends from the terminal 163 of the transformer secondary over the test wire 159, to the terminal 5 and from there over the pressure switch 172 to terminal 6 and from there over the normally closed relay switch 190 and the thermal switch elements 121 and 123, then the rectifier 184 to the opposite terminal 161 of the secondary 158. The fact that the solenoid 76 is energized means that the cam 44 has been located by the solenoid at the position illustrated in FIG. 5 to open the switch 106, but this is of no consequence because the open thermostat switch 160 has already interrupted the power circuit placing secondary 158 across the terminals 1 and 2. The safety circuit referred to above is so designated because that circuit will interrupt the application of power to the rectifier 184 and the solenoid 76 so as to permit the spring 40 to move the damper 26 to its open position in the housing 10 whenever any of the following occurs: the occurrence of a demand for heat which closes the thermostat switch 160, thus energizing the relay 96 and opening the relay switch 190, the presence of an excessive gas temperature in the vent stack, which opens the thermal switch elements 121 and 123, or the presence of a gas pressure exerted upon the pressure switch 172.

Upon movement of the thermostat switch to a position which would demand heat, the relay 96 would be energized because the thermostat switch, being now closed, would place the relay 96 across the transformer secondary. The energization of the relay 96 would then open the normally closed relay switch 190, thus opening the safety circuit and deenergizing the solenoid 76. This would enable the spring 40 to move the damper plate 26 to the normally open position. As the damper plate 26 approaches the vertical position illustrated in FIG. 3, the switch 106 is closed by operation of the cam 44 to complete a combustion control circuit. This control circuit places the gas valve 166 in parallel with the relay 96 and in series with the transformer secondary as well as the thermostat switch, the control circuit proceeding from the gas valve 166 to the terminal 3 and from there to the terminal 1, the transformer secondary, the thermostat switch, the terminal 2, the switch 106, the terminal 4 and thence to the other side of the gas valve. Thus, closure of the thermostat switch 160 completed a control circuit which permitted the damper plate 26 to move toward the open position illustrated in FIG. 3 and in so doing to energize the gas valve 166 so as to initiate combustion.

When the house or medium being heated has reached a temperature level sufficient to open the thermostat switch 160, the series circuit between the transformer secondary and the relay 96 is broken, permitting the relay switch 190 to close. When the switch 190 has closed, the solenoid is energized, thus moving the damper plate 26 to its closed position during which the switch 106 is opened to deenergize the gas valve. Since many combustion devices to which the present invention is suited utilize a pilot light which produces a continuing release of combustion products at a low level, the bumpers 68 are preferably so located that the damper plate 26 is not permitted to fully close the housing 10.

Should there have occurred a mechanical failure such that the gas valve would fail to deenergize, a continuing gas pressure against the pressure switch 172 would cause that switch to open. The opening of the switch 172 does two things. First the series circuit connecting the transformer secondary 158 in series with the relay 96 and the thermostat switch is opened. This permits the spring 40 to move the damper 26 to its open position, thus to be assured that gas escaping the gas manifold is provided a path through the damper housing to the ambient atmosphere. Secondly, the opening of the switch 172 removes a shunt across the audible alarm device 178, with the consequence that the alarm device is energized by the transformer secondary through the path including the test wire 159, the terminal 5, the alarm device 178, the terminal 6, the normally closed relay switch 190 (now closed because the thermostat switch 160 is open), the heat sensor 116 and the rectifier 184, back to the transformer secondary 158. The audible alarm 178 then announces to those in the household that an improper operation is occurring.

In this case, the improper operation would be the ecape of gas into the furnace chamber and quite possibly to other regions of the house. The hazard is great if the furnace has a pilot light, and may be equally severe if the furnace has an electronic ignition device. If the gas with which the furnace is fueled is a natural gas, the defective condition, assuming an electronic igniter, may be of only secondary importance since the natural gas being lighter than air will be able to rise up the vent stack through the now open damper housing to escape to the surrounding atmosphere. Should the fuel be a heavier gas, such as so-called LP gas, the gas escaping the gas manifold to the furnace chamber will not rise up the vent stack even though the damper 26 is in the open position. In such cases, the audible alarm provided by the device 178 is essential to alert the occupants of the household of a hazardous condition.

Another operating defect that can occur is that the gas valve may fail to close sufficiently to terminate a continuing combustion in the furnace chamber, although it does close sufficiently to allow the pressure switch 172 to close. Assuming the thermostat switch 160 is open and thus seeking to discontinue combustion, the damper plate 26 may nevertheless be driven by the solenoid 76 to the closed position. An ensuing accumulation of relatively hot exhaust gases under the damper 26 will elevate the temperature of the heat sensor 116 so as to separate its switch elements 121 and 123 and thereby disable the solenoid 76. This permits the spring 40 to move the damper plate 26 to its open position, whereupon appropriate ventilation is provided in view of the continuing combustion. The heat sensor 116 is normally preset by a manipulation of the adjuster 124 to operate at approximately 200° F. To prevent an undesired cyclic operation of the heat sensor, that element is preferably surrounded by a heat-absorbing medium 192, which may be an electrical conductor or a nonconductor or a composite of the two, the purpose of such medium being to retain enough heat in contact with the heat sensor 116 so that, should a condition obtain in which the heat sensor contacts are opened due to excess heat in the vent stack, this open circuit condition will remain for a period of time sufficient to enable the spring 40 to move the damper plate 26 to its open position.

In order to enhance the sensitivity of the heat sensor, it is desirable in many applications to provide the damper plate 26 with an aperture 198 as shown in FIG. 1, such aperture overlying the heat sensor 116 so as to direct alongside the heat sensor those gases seeking to flow upwardly through the housing 10, thus maximizing the tendency of such gases to deliver heat to the heat sensor.

During any such improper operation occasioned by a defect of the gas valve, the damper plate 26 is preferably locked in its open position by the use of a tool such as the described pencil 152, which locks the damper in the open position until appropriate repairs can be made.

The foregoing discussion has assumed the prior existence of a house heated by means of a gas furnace and encompasses the procedures employed for LP gas-fueled furnaces as well as natural gas-fueled furnaces. The discussion has also made reference to electronic pilot lights as opposed to the more conventional gas-burning pilot lights.

Those skilled in the art will appreciate that the above described installation of a device embodying the present invention is appropriately referred to as a retrofit installation. Thus, the house is already built and may have been heated successfully for years, but the homeowner has now elected to connserve on fuel costs by retrofitting the present invention to the household vent stack. Since the damper 26 is positively driven by the spring 40 and the solenoid 76, it can be mounted in any position and thus does not require that the vent stack extend vertically.

While the disclosed device has designed accommodation either for LP gas or for natural gas, those skilled in the art will appreciate that the pressure switch 172 and its associated audible alarm mechanism may be replaced by a shunt (not shown) across the terminals 5 and 6. This results in an automatic damper which operates the same as described except, of course, that it lacks the safety of the pressure switch 172 and the audible alarm 178. Where retrofit is contemplated into homes or other facilities utilizing LP gas fuel, the pressure switch 172, as well as the audible alarm device 178, are obviously preferable.

The present damper mechanism is also well suited for retrofit into homes utilizing oil burners, in which case the aforementioned shunt connected across the terminals 5 and 6 is desirable and the pressure switch 172, as well as its associated alarm device 178, are no longer needed.

While the present description has been addressed primarily to retrofit installations, it should be appreciated that the present invention has obvious utility as original equipment for houses and other facilities yet to be constructed. In the case of original equipment installations, the installer will frequently have adequate knowledge concerning the transformer secondary to eliminate the need for the test wire 159 previously described; and, in this case, the light 134 may be omitted.

Although the preferred embodiments of the present invention have been described, it will be understood that various changes may be made within the scope of the appended claims.

Having thus described my invention, I claim:

1. In a mechanism for controllably venting gases from the flue of a combustion apparatus, said mechanism comprising a housing for mounting to said flue and into which said gases pass, a damper mounted in said housing and movable between a first position opening said housing for the passage of gases therefrom and a second position substantially closing said housing against the passage of gases therethrough, the improvements comprising yieldable means biasing said damper to said first position, motive means for holding said damper against the bias of said yieldable means in said second position, heat sensor means disposed in said housing upstream of said damper for disabling said motive means upon sensing heated gases in said housing and means for connection in circuit with said motive means of a thermostat responsive to a medium heated by the combustion apparatus for also disabling said motive means.

2. The improvement of claim 1 further including heat-absorbing means in contact with said heat sensor means for prolonging the disability of said motive means upon movement of said damper to said first position.

3. The improvement of claim 1 wherein said combustion apparatus includes a valve for regulating the passage of combustible fuel to said apparatus, and including pressure sensor means responsive to the pressure of the combustible fuel released by said valve for disabling said motive means.

4. The improvement of claim 3 further including alarm means responsive to said pressure sensor means for sounding an audible alarm upon operation of said pressure sensor means to disable said motive means.

5. The improvement of claim 3 wherein said heat sensor means and said pressure sensor means comprise electrical switches and said motive means is an electrical solenoid, the heat sensor switch and pressure sensor switch being connected electrically in series with said solenoid and a source of electrical power.

6. In a heating system of the type comprising a combustion apparatus, a thermostat for regulating the operation of said apparatus, a flue for venting exhaust gas resulting from the operation of said apparatus; a damper mounted in said flue, yielding means biasing said damper to a first position opening said flue, motive means energizable to move said damper against the bias of said yielding means to a second position substantially closing said flue, terminal means for connection of said motive means to a source of power, a safety circuit including first, normally closed switch means electrically connected in series with said motive means between said terminal means, relay means for moving said switch means from its normally closed position to an open position, and a control circuit for connecting said relay means in series with said thermostat between said terminals, the improvement including sensor means exposed to gas passing through said heating system for interrupting said safety circuit.

7. The system of claim 6 wherein said sensor means comprises a heat sensor supported in said flue, second, normally closed switch means included in said safety circuit, and means responsive to said heat sensor for opening said second switch means.

8. The system of claim 6 wherein said system includes a gas orifice for delivering gas to said combustion apparatus, said sensor means comprising a third, normally closed switch means included in said control circuit, and means responsive to the pressure of gas passing to said orifice for opening said third switch means.

9. The system of claim 8 further including audible alarm means electrically connected across said third switch means.

10. In an automatic damper mechanism for retrofit installation in the flue of a combustion apparatus of the type comprising a valve for regulating the flow of fuel for combustion therein, said valve having a pair of valve terminals, and comprising a thermostat *having a thermostat* switch in series with a voltage source for regulating the operation of said combustion apparatus in response to heat demand, said voltage source having end terminals, said thermostat switch and said voltage source disposed in series between terminals of said thermostat; the improvement comprising a circuit board having at least four terminals, a first pair of said circuit board terminals for electrical connection respectively to said valve terminals, one terminal of said first pair and a third of said circuit board terminals comprising a second pair of terminals for electrical connection respectively to said thermostat terminals, an electric signal device, means electrically connecting said signal device between a remaining one of said circuit board terminals and said one terminal, and a wire connected at one end to said remaining one of said terminals, the other end of said wire movable for selective connection to opposite end terminals of said voltage source whereby upon touching said other end successively to said end terminals an installer may locate for permanent connection of said other end that end terminal which most steadily energizes said signal device.

11. In a vent mechanism for venting gases from a combustion system, said vent mechanism of the type having a housing through which said gases pass, a damper, shaft means mounting said damper for rotation in said housing, yieldable means rotatably biasing said shaft to a first position wherein said damper opens said housing, motive means for moving said shaft against the bias of said yieldable means to a second position substantially closing said housing, the improvements wherein said motive means comprises a straight pull solenoid having an armature, a cam member keyed to said shaft and having a periphery encircling said shaft, and link means connecting the armature of said solenoid eccentrically to said cam means, said cam means having a peripheral flat, said vent mechanism having an aperture through a wall of said housing and cover means covering said aperture, said solenoid and said cam means, said cover means having a second aperture therethrough aligned with said periphery and the first mentioned aperture for passing a tool adjacent said flat to block rotation of said cam member should said yieldable means be disabled.

12. An automatic damper mechanism for installation into the vent stack of a combustion apparatus for satisfying the heat demand of a thermostat switch comprising, in combination:

a damper housing;

a damper mounted in said housing for movement between a first position opening said housing for the passage of gases therethrough and a second position substantially closing said housing;

yieldable means for biasing said damper to said first position;

electrical solenoid means for moving said damper against the bias of said yieldable means to said second position, said housing including bumper means engaged by said damper to locate said second position;

means for exerting a drag upon the movement of said damper to prevent bouncing of said damper against said bumper means; and a safety circuit for electrically connecting said solenoid in series with a source of power for operating said solenoid, said safety circuit including first switch means for interrupting the continuity thereof, said damper mechanism including a relay, means for electrical attachment of said relay to said thermostatic switch so that said relay is energized upon closure of said thermostatic switch, said first switch means responsive to said relay so that said first switch means is opened by said relay upon closure of said thermostatic switch;

said safety circuit including second switch means, said damper mechanism including a heat sensor disposed in said housing for opening said second switch in response to elevated temperatures in said housing, said damper having an opening therethrough for inducing gases seeking to escape said housing to flow adjacent said heat sensor;

said safety circuit including third switch means, and means responsive to the pressure of fuel passing to said combustion apparatus for opening said third switch means when fuel passes to said combustion apparatus.

13. In a mechanism for controllably venting gases from a combustion apparatus, said apparatus including a gas orifice for delivering fuel for combustion in said apparatus, said mechanism comprising a housing into which said gases pass, a damper mounted in said housing and movable between a first position opening said housing for the passage of gases therefrom and a second position substantially closing said housing against the passage of gases therethrough, the improvements comprising yieldable means biasing said damper to said first position, motive means for holding said damper against the bias of said yieldable means in said second position, pressure sensor means for disabling said motive means upon sensing the pressure of fuel being delivered to said combustion and means for connection in circuit with said motive means of a thermostat responsive to a medium heated by the combustion apparatus for also disabling said motive means.

14. The improvement of claim 2 wherein said heat-absorbing means surrounds said heat sensor means.

15. The improvement of claim 2 wherein said heat-absorbing means is sized to prolong the disability of said motive means at least until said damper is moved by said yieldable means to said first position.

*16. In a heating system of the type comprising a combustion apparatus, a thermostat for regulating the operation of said apparatus, a flue for venting exhaust gas resulting from the operation of said apparatus; a damper mounted in said flue, yieldable means biasing said damper to a first position opening said flue, motive means energizable to move said damper against the bias of said yieldable means to a second position substantially closing said flue, terminal means for connection of said motive means to a source of power, a safety circuit including first switchable means electrically connected in series with said motive means between said terminal means for delivering to said motive means sufficient power from said source for operating said motive means, means for switching said switchable means to terminate the delivery of sufficient power from said source for operating said motive means, and a control circuit for connecting said means for switching in series with said thermostat between said terminal means, the improvement including sensor means exposed to gas passing through said heating system for interrupting said safety circuit.*

*17. The system of claim 16 wherein said sensor means comprises a heat sensor supported in said flue, second switchable means included in said safety circuit, and means responsive to said heat sensor for switching said second siwtchable means.*

*18. The system of claim 16 wherein said system includes a gap orifice for delivering gas to said combustion appara-*

*tus, said sensor means comprising a third switchable means included in said control circuit, and means responsive to the presence of gas passing to said orifice for switching said third switchable means.*

*19. The system of claim 18 further including audible alarm means electrically connected across said third switchable means.*

*20. An automatic damper mechanism for installation into the vent stack of a combustion apparatus for satisfying the heat demand of a thermostat switch comprising, in combination:*

*a damper housing;*

*a damper mounted in said housing for movement between a first position opening said housing for the passage of gases therethrough and a second position substantially closing said housing;*

*yieldable means for biasing said damper to said first position;*

*electrical solenoid means for moving said damper against the bias of said yieldable means to said second position, said housing including bumper means engaged by said damper to locate said second position;*

*means for exerting a drag upon the movement of said damper to prevent bouncing of said damper against said bumper means; and*

*a safety circuit for electrically connecting said solenoid means in series with a source of power for operating said solenoid means, said safety circuit including first switch means for interrupting the continuity thereof, said damper mechanism including a relay, means for electrical attachment of said relay to said thermostatic switch so that said relay is energized upon closure of said thermostatic switch, said first switch means responsive to said relay so that said first switch means is switched by said relay upon closure of said thermostatic switch;*

*said safety circuit including second switch means, said damper mechanism including a heat sensor disposed in said housing for opening said second switch in response to elevated temperatures in said housing, said damper having an opening therethrough for inducing gases seeking to escape said housing to flow adjacent said heat sensor;*

*said safety circuit including third switch means, and means responsive to the pressure of fuel passing to said combustion apparatus for switching said third switch means when fuel passes to said combustion apparatus.*

* * * * *

UNITED STATES PATENT AND TRADEMARK OFFICE

CERTIFICATE OF CORRECTION

PATENT NO. : Reissue Patent No. 31,112

DATED : Reissued December 28, 1982

INVENTOR(S) : John Prikkel, III

It is certified that error appears in the above-identified patent and that said Letters Patent are hereby corrected as shown below:

Column 6, line 29, change "single" to read ---signal---.

Column 6, line 66, change "installations" to read ---installation---.

Column 9, line 21, change "connserve" to read ---conserve---.

Claim 6, line 45, after "means" insert ---disposed upstream of said damper and---.

Claim 13, line 31, after "combustion" insert ---apparatus---.

Claim 16, line 59, after "means" insert ---disposed upstream of said damper and---.

Claim 18, line 68, change "gap" to read ---gas---.

UNITED STATES PATENT AND TRADEMARK OFFICE

CERTIFICATE OF CORRECTION

PATENT NO. : Reissue Patent No. 31,112
DATED : Reissued December 28, 1982
INVENTOR(S) : John Prikkel, III It is certified that error appears in the above-identified patent and that said Letters Patent are hereby corrected as shown below:

The following claims should be added:

21. The mechanism of claim 1 wherein said damper has an aperture therethrough overlying said heat sensor for directing the flow of gases through said housing.

22. The mechanism of claim 1 further including a fuel supply valve connected in circuit with said motive means and means responsive to movement of said damper to said second position for interrupting the circuit connection to said fuel supply valve.

UNITED STATES PATENT AND TRADEMARK OFFICE

CERTIFICATE OF CORRECTION

PATENT NO. : Reissue Patent No. 31,112

DATED : December 28, 1982

INVENTOR(S) : John Prikkel, III

It is certified that error appears in the above-identified patent and that said Letters Patent is hereby corrected as shown below:

23. The mechanism of claim 1 wherein said motive means is a direct current motive means.

On the title page, "20 Claims" should read -- 23 Claims --.

Signed and Sealed this

*Twenty-fifth* Day of *October 1983*

[SEAL]

*Attest:*

GERALD J. MOSSINGHOFF

*Attesting Officer*

*Commissioner of Patents and Trademarks*